(12) United States Patent
Mondragon et al.

(10) Patent No.: US 9,958,015 B2
(45) Date of Patent: May 1, 2018

(54) ROLLING-ELEMENT TELESCOPING SHAFT ASSEMBLY

(71) Applicant: Steering Solutions IP Holding Corporation, Saginaw, MI (US)

(72) Inventors: Eduardo Mondragon, Freeland, MI (US); William P. Skvarla, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 61 days.

(21) Appl. No.: 14/498,216

(22) Filed: Sep. 26, 2014

(65) Prior Publication Data
US 2015/0094158 A1 Apr. 2, 2015

Related U.S. Application Data

(60) Provisional application No. 61/883,518, filed on Sep. 27, 2013.

(51) Int. Cl.
*F16D 3/06* (2006.01)

(52) U.S. Cl.
CPC .................... *F16D 3/065* (2013.01)

(58) Field of Classification Search
CPC ....................................................... F16D 3/065
See application file for complete search history.

(56) References Cited

U.S. PATENT DOCUMENTS 6,217,456 B1 * 4/2001 Jacob ...................... F16C 3/035
                                                                 464/146
8,075,412 B2 * 12/2011 Lehmann ................ F16C 3/035
                                                                 464/167

(Continued)

FOREIGN PATENT DOCUMENTS

| CN | 101506537 A | 8/2009 |
|---|---|---|
| DE | 10123221 C1 | 2/2003 |
| DE | 10233758 A1 | 7/2004 |

OTHER PUBLICATIONS

Office Action dated Dec. 2, 2014 in corresponding German Patent Application 10 2014 113 972.0.

(Continued)

*Primary Examiner* — Matthieu F Setliff
(74) *Attorney, Agent, or Firm* — Cantor Colburn LLP

(57) ABSTRACT

A rolling-element telescoping shaft assembly for connecting a driveshaft and transmitting a torque includes an outer shaft member extending along a longitudinal axis and defines an interior bore and inner surface. An inner shaft member is at least partially disposed within the bore and telescopically moveable relative thereto along the axis and defines an outer surface. Rolling-element outer grooves are arranged in the inner surface, distributed around the axis, and functional (i.e., used for transmitting a torque). Outer recesses are defined between the outer grooves and define a shorter distance between adjacent torque-transmitting outer grooves. Rolling-element inner grooves are defined on the outer surface and distributed around the axis. Rolling elements are rollingly arranged in the outer and inner grooves and rollingly engage the outer and inner shaft members during telescoping movement of the shaft assembly to reduce friction therebetween.

15 Claims, 2 Drawing Sheets

(56) References Cited

U.S. PATENT DOCUMENTS

2002/0169026 A1    11/2002   Cermak et al.
2004/0214647 A1    10/2004   Welschof
2010/0227696 A1*    9/2010   Disser .......................... 464/145

OTHER PUBLICATIONS

Chinese Office Action for Chinese Application No. 201410756156.2 dated Sep. 2, 2016.

* cited by examiner

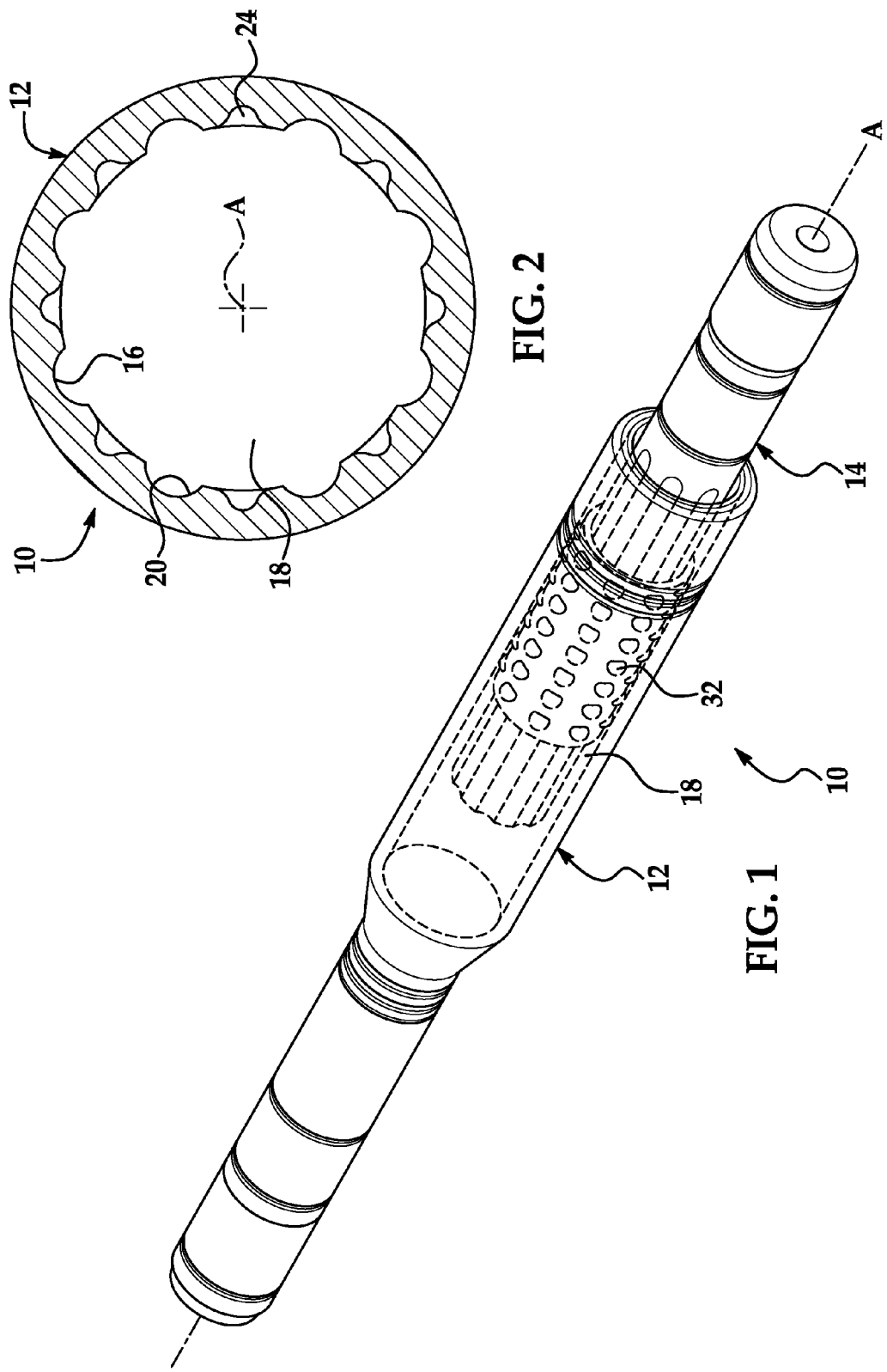

ROLLING-ELEMENT TELESCOPING SHAFT ASSEMBLY

CROSS-REFERENCE TO RELATED APPLICATION

This application is based upon and claims benefit of the filing date of U.S. Patent Application 61/883,518 filed on Sep. 27, 2013 and entitled "Telescopic Shaft," which is incorporated herein by reference.

FIELD OF INVENTION

The invention relates to, in general, a shaft assembly for transmitting a torque and, more specifically, a telescoping shaft assembly for transmitting torque in a driveline system.

BACKGROUND OF INVENTION

A telescoping shaft assembly capable of transmitting a torque is often used in a driveline system as a torque-transmitting mechanism. The telescopic shaft assembly typically includes a tubular outer shaft member and an inner shaft member. The inner shaft member is at least partially disposed within the outer shaft member and moveable relative thereto along a longitudinal axis. The telescopic shaft assembly typically uses rolling elements between the outer and inner shaft members to reduce friction therebetween.

The rolling elements of the telescopic shaft assembly typically include linear bearings and often include steel rollers or steel balls. The rolling elements are configured to roll between the outer and inner shaft members during telescoping movement of the telescopic shaft assembly while continuing to transmit torque.

A telescopic shaft configured to connect two constant-velocity joints is known, wherein redundant rolling-element grooves have been added to an outer shaft member of the telescopic shaft to minimize distortion during heat-treatment. However, only one-half or one-third of the grooves is functional (i.e., used for transmitting torque). This configuration restricts compactness of packaging for a given torque capacity once a minimum web (i.e., section between adjacent functional grooves) has been reached, limiting a chordal distance between the grooves. In a configuration in which the outer shaft member has two or three times a number of grooves than has an inner shaft member, the web in the inner shaft member always is larger than that in the outer shaft member.

SUMMARY OF INVENTION

In accordance with a non-limiting exemplary embodiment of the invention, a rolling-element telescoping shaft assembly for connecting a driveshaft and transmitting a torque is provided. The shaft assembly includes an outer shaft member extending along a longitudinal axis and defines an interior bore and inner surface. An inner shaft member is at least partially disposed within the interior bore of the outer shaft member and telescopically moveable relative thereto along the axis and defines an outer surface. Rolling-element outer grooves are arranged in the inner surface of the outer shaft member and distributed around the axis, and all of the outer grooves are functional (i.e., used for transmitting the torque). Outer recesses are defined between the outer grooves and define a shorter distance between adjacent torque-transmitting outer grooves. Rolling-element inner grooves are defined on the outer surface of the inner shaft member and distributed around the axis. Rolling elements are rollingly arranged in the outer and inner grooves and rollingly engage the outer and inner shaft members during telescoping movement of the shaft assembly to reduce friction therebetween.

Accordingly, the invention provides a rolling-element telescoping shaft assembly that overcomes the compact-packaging restriction (i.e., when there are redundant grooves in the outer shaft member and the minimum web has been reached). More specifically, the shaft assembly reduces the chordal distance between adjacent functional grooves, which maximizes or optimizes the packaging compactness for a given torque capacity. The shaft assembly also is designed cost-effectively and allows for longer tooling life, resulting in lower or minimized manufacturing cost. Fewer space restrictions and more compact packaging of the shaft assembly also permit higher flexibility for vehicle manufacturers. Due to its lower mass and lower rotational inertia, the shaft assembly also improves fuel economy.

BRIEF DESCRIPTION OF EACH FIGURE OF DRAWING

The subject matter that is regarded as the invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

FIG. 1 is a perspective view of a non-limiting exemplary embodiment of a rolling-element telescoping shaft assembly according to the invention;

FIG. 2 is a cross-sectional view of a non-limiting exemplary embodiment of an outer shaft member of the rolling-element telescoping shaft assembly according to the invention;

DETAILED DESCRIPTION OF EMBODIMENTS OF INVENTION

Figure 3:
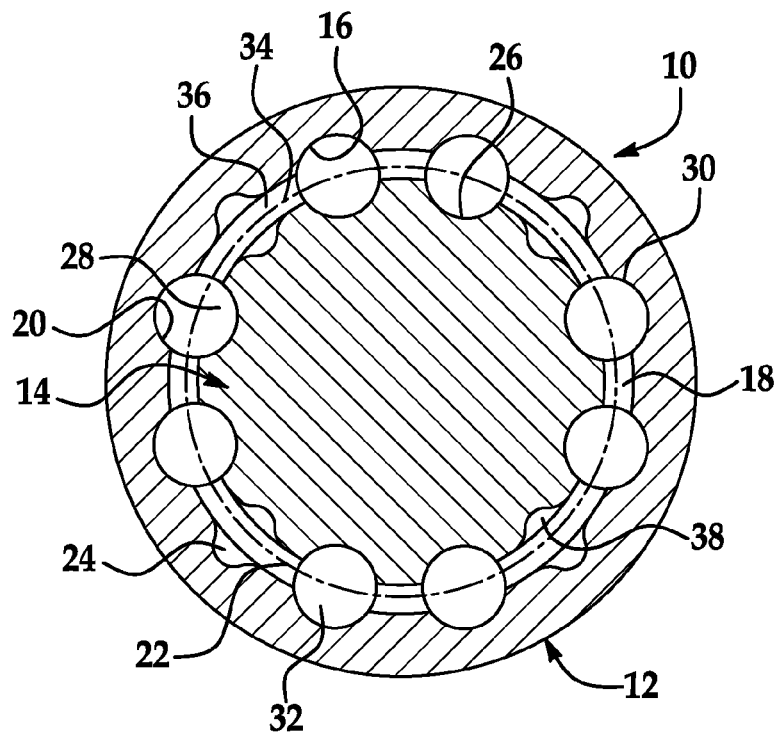
FIG. 3 is a cross-sectional view of another non-limiting exemplary embodiment of the rolling-element telescoping shaft assembly according to the invention.

The invention is described below and shown in the drawing with reference to specific exemplary embodiments thereof without limiting same. Referring to the Figures, wherein like numerals indicate corresponding parts throughout the several views, a shaft assembly is shown generally at 10. The shaft assembly 10 is a rolling-element telescoping shaft assembly 10 capable of connecting to a drive shaft (not shown) and transmitting a torque. Although the shaft assembly 10 may be incorporated into any suitable device, the shaft assembly 10 is particularly suited for use as a telescopic shaft assembly in a driveline system of a vehicle.

Referring to FIG. 1, the shaft assembly 10 includes an outer shaft member 12 and inner shaft member 14 telescopically engaged with the outer shaft member 12. The outer shaft member 12 extends along a longitudinal axis "A" and defines a circular-cylindrical or multi-lobed inner surface 16 (FIG. 2), which defines an interior bore 18 centered on the axis "A." It should be appreciated that the outer shaft member 12 is generally tubular.

Figure 4:
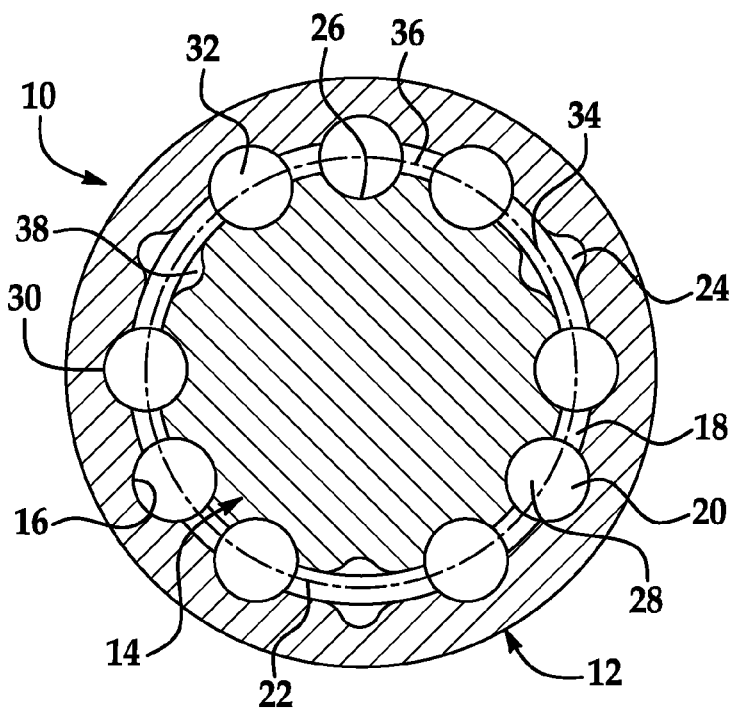
FIG. 4 is a cross-sectional view of yet another non-limiting exemplary embodiment of the rolling-element telescoping shaft assembly according to the invention.

Referring to FIGS. 2-4, the inner surface 16 of the outer shaft member 12 defines a set of longitudinal rolling-element outer grooves 20 arranged in the inner surface 16. Each outer groove 20 extends along and is disposed generally parallel with the axis "A." As such, the outer groove 20 is disposed laterally spaced from a plane extending through the axis "A" and extends along a path having a same direction as that of the axis "A." The outer grooves 20 are distributed around the axis "A," and all of the outer grooves 20 are used for transmitting torque and, thus, are functional (compared to the outer shaft member of some known telescopic shafts where only about a half or third of the grooves may be functional). As described in detail below, in a version of the embodiment, the outer grooves 20 are not uniformly distributed around the axis "A." In FIGS. 3 and 4, a "ball circle diameter" (BCD) is represented at 22 and acts as a reference, which is described further below.

A plurality or set of extruded or formed prismatic outer recesses 24 is distributed between adjacent outer grooves 20 around the axis "A." A geometry or shape of each outer recess 24 is different than that of each outer groove 20. In a version of the embodiment, the outer recess 24 is concave with respect to the axis "A" and blends smoothly with the interior bore 18, and the outer groove 20 is hemispherical and concave with respect to the axis "A." A radius of the outer recess 24 is lesser than that of the outer groove 20. The outer grooves 20 and outer recess 24 are positioned symmetrically with respect to the axis "A."

The set of outer recesses 24 is distributed between the outer grooves 20 and arranged generally parallel with the axis "A." A geometry or shape of each outer recess 24 is different than that of each of the outer grooves 20. An imaginary plane defined by an open end of the outer recess 24 is positioned at the bore 18. A length of each outer recess 24 is similar to that of each outer groove 20, and a width of the outer recess 24 at the bore 18 is lesser than a width of the outer groove 20 at the bore 18. In this way, the outer recesses 24 allow a shorter distance between adjacent torque-transmitting outer grooves 20. The distance between the outer grooves 20 can be defined as a chord of the BCD. In a version of the embodiment, each outer recess 24 is prismatic and concave with respect to the axis "A." The outer recess 24 is also positioned between an upper part of an outer groove 20 and an upper part of an adjacent outer groove 20. A radius and cross-sectional area of the outer recess 24 are lesser than those of the outer groove 20. The outer recesses 24 are positioned symmetrically with respect to the axis "A."

The inner shaft member 14 is at least partially disposed within or enters the bore 18 of the outer shaft member 12. The inner shaft member 14 also defines an outer surface 26 and longitudinal axis "A" that, in an "assembled" condition of the shaft assembly 10, coincides with the longitudinal axis "A" of the outer shaft member 12. The inner shaft member 14 is also telescopically moveable relative to the outer shaft member 12 along the axis "A."

The outer surface 26 of the inner shaft member 14 defines a set of longitudinal rolling-element inner grooves 28 arranged in the outer surface 26. Each inner groove 28 extends along the axis "A" and is disposed generally parallel with the axis "A." As such, the inner groove 28 is disposed laterally spaced from the plane extending through the axis "A" and extends along a path having a same direction as that of each of the axis "A" and outer grooves 20. The inner groove 28 is hemispherical and convex with respect to the axis "A." The inner grooves 28 are positioned symmetrically with respect to the axis "A." An imaginary plane defined by an open end of each outer groove 20 is positioned at an imaginary plane defined by an open end of a corresponding inner groove 28 such that corresponding outer and inner grooves 20, 28 mirror each other. Together, the corresponding outer and inner grooves 20, 28 form respective openings 30.

The shaft assembly 10 includes a plurality of rolling elements 32—e.g., balls or rollers—each of which is rollingly arranged within a corresponding opening 30. The rolling elements 32 rollingly engage the outer and inner shaft members 12, 14 during relative axial motion between or telescoping movement of the first and second shaft members 12, 24 with minimum sliding friction.

As stated above, a number of inner grooves 28 can correspond to a number of outer grooves 20, wherein each of the inner grooves 28 is arranged opposite to a corresponding outer groove 20 to form pairs. In an aspect, the number of pairs is at least two. In this case, at least one rolling element 32 is rollingly arranged in each pair of opposed outer and inner grooves 20, 28. The grooves 20, 28 arranged opposite to one another form higher kinematic pairs with the corresponding rolling elements 32 connecting them.

A sleeve-like cage 34 can be arranged between the outer surface 26 of the inner shaft member 14 and inner surface 16 of the outer shaft member 12. The cage 34 defines a plurality of radial-through pockets 36 in which corresponding rolling elements 32 are engaged and kept spaced from each other in a set of imaginary planes defined perpendicular to the axis "A" in the pairs of the outer and inner grooves 20, 28.

Referring specifically to FIG. 3, the shaft assembly 10 is shown in an assembled condition. In the illustrated embodiment of the shaft assembly 10, the grooves 20, 28 of the outer and inner shaft members 12, 14 are arranged opposite to each other in groups of two adjacent pairs of the grooves 20, 28. More specifically, the outer recesses 24 are distributed between the groups. The inner shaft member 14 defines a set of formed inner prismatic recesses 38 that are distributed between the groups of the two adjacent inner grooves 28. This allows for reduced distortion due to heat-treatment.

Referring specifically to FIG. 4, the shaft assembly 10 is shown in the assembled condition. In the illustrated embodiment of the shaft assembly 10, the respective grooves 20, 28 of the outer and inner shaft members 12, 14 are arranged opposite to each other in groups of three adjacent pairs of the grooves 20, 28.

Particularly advantageous conditions of the shaft assembly 10 are obtained if the outer shaft member 12 is produced by a radial-forging or rotary-swaging process using a mandrel that defines an internal geometry of the outer shaft member 12. In FIG. 2, further particularly advantageous conditions are obtained if the inner shaft member 14 of the shaft assembly 10 is produced by an extrusion process. In FIGS. 3 and 4, further particularly advantageous conditions are obtained if the groups of two or three adjacent inner grooves 28 are manufactured at the same time by a material-removing process that uses a single tool to remove material in two or three inner grooves 28 at once, reducing production costs.

Accordingly, the shaft assembly 10 overcomes the compact-packaging restriction (i.e., when there are redundant grooves 20 in the outer shaft member and the minimum web has been reached). More specifically, the shaft assembly 10 reduces the chordal distance between adjacent functional grooves 20, which maximizes or optimizes the packaging compactness for a given torque capacity. Furthermore, the shaft assembly 10 is designed cost-effectively and allows for longer tooling life, resulting in lower or minimized manufacturing cost. In addition, fewer space restrictions and more compact packaging of the shaft assembly 10 permit higher flexibility for vehicle manufacturers. Moreover, due to lower mass and lower rotational inertia of the shaft assembly 10, the shaft assembly 10 improves fuel economy.

While the invention has been disclosed in detail in connection with only a limited number of embodiments, it should be readily understood that the invention is not limited to such embodiments. Rather, the invention can be modified to incorporate any number of variations, alterations, substitutions, or equivalent arrangements not heretofore disclosed, but that are commensurate with the spirit and scope of the invention. Additionally, while various embodiments of the invention have been disclosed, it is to be understood that aspects of the invention may include only some of these embodiments. Accordingly, the invention is not to be seen as limited by the foregoing disclosure.

Having thus described the invention, it is claimed:

1. A rolling-element telescoping shaft assembly for connecting a driveshaft and transmitting a torque, the shaft assembly comprising:
    an outer shaft member extending along a longitudinal axis and defining an interior bore and inner surface;
    an inner shaft member at least partially disposed within the interior bore of the outer shaft member, telescopically moveable along the longitudinal axis relative to the outer shaft member, and defining an outer surface;
    a plurality of formed outer prismatic recesses that are arranged about the inner surface of the outer shaft member;
    a plurality of rolling-element outer grooves that are arranged in adjacent sets of at least two about the inner surface of the outer shaft member, the adjacent sets being distributed around the longitudinal axis without a prismatic recess disposed between the rolling-element outer grooves that define each adjacent set, used for the transmittal of the torque, and each of which defines a radius of the outer groove;
    the plurality of formed outer prismatic recesses being defined between sets of the plurality of rolling-element outer grooves, the plurality of formed outer prismatic recesses without rolling elements define a distance between adjacent ones of the plurality of rolling-element outer grooves and a shape different than that of the rolling-element outer grooves and each of which defines a radius of the formed outer prismatic recess lesser than that of the outer grooves;
    a plurality of rolling-element inner grooves that are arranged in sets of at least two about the outer surface of the inner shaft member that are complementary to the adjacent sets of the plurality of rolling-element outer grooves, the complementary sets being distributed around the longitudinal axis, and each of which defines a radius of the inner groove;
    a plurality of formed inner prismatic recesses that define a shape different than that of the outer and inner grooves and are defined between the sets of the plurality of rolling-element inner grooves and are arranged such that corresponding outer and inner recesses are radially spaced from each other and each of which defines a radius of the inner recess lesser than that of the inner and outer grooves; and
    a plurality of rolling elements that are rollingly arranged in the outer and inner grooves, the plurality of rolling elements rollingly engage the outer and inner shaft members during telescoping movement of the shaft assembly and guide a cage that is arranged between the outer surface of the inner shaft member and the inner surface of the outer shaft member, the cage defining a plurality of radial-through pockets in which the rolling elements are engaged and kept spaced apart from each other.

2. The shaft assembly of claim 1, wherein the bore is substantially centered on the longitudinal axis.

3. The shaft assembly of claim 1, wherein the inner surface of the outer shaft member is at least one of substantially circular-cylindrical and multi-lobed.

4. The shaft assembly of claim 1, wherein the outer recesses are distributed between the outer grooves and arranged substantially parallel with the longitudinal axis.

5. The shaft assembly of claim 1, wherein a width of the outer recesses at the bore is lesser than a width of the outer grooves at the bore.

6. The shaft assembly of claim 1, wherein the inner grooves are distributed around the longitudinal axis and extend substantially parallel therewith.

7. The shaft assembly of claim 1, wherein a number of the inner grooves corresponds to a number of the outer grooves, each of the inner grooves is arranged substantially opposite to a corresponding one of the outer grooves to form pairs, and at least one of the rolling elements is rollingly arranged in each of the pairs of the opposed outer and inner grooves.

8. The shaft assembly of claim 7, wherein the pairs are arranged in groups of three adjacent pairs.

9. The shaft assembly of claim 8, wherein the cage is sleeve-like.

10. The shaft assembly of claim 8, wherein the rolling elements are engaged and kept spaced from each other in a set of imaginary planes defined in the outer and inner grooves.

11. The shaft assembly of claim 10, wherein the set of imaginary planes are defined substantially perpendicular to the longitudinal axis.

12. The shaft assembly of claim 1, wherein the outer and inner grooves are arranged substantially opposite to each other around the longitudinal axis in groups of two or three adjacent pairs of the grooves.

13. The shaft assembly of claim 12, wherein the number of pairs is a multiple of two or three and greater than or equal to four.

14. A rolling-element telescoping shaft assembly comprising:
    an outer shaft member defining an interior bore and inner surface;
    an inner shaft member at least partially disposed within the interior bore of the outer shaft member defining an outer surface;
    a plurality of rolling-element outer grooves, the plurality of rolling-element outer grooves are arranged in sets of at least two adjacent pairs about the inner surface of the outer shaft member without a prismatic recess disposed between the rolling-element outer grooves that define each adjacent pair, and each of which defines a radius of the outer groove;
    a plurality of formed outer prismatic recesses that are defined between respective upper parts of the outer grooves and empty and define a distance between adjacent ones of the torque-transmitting outer grooves and a shape different than that of the outer grooves and each of which defines a radius of the outer recess lesser than that of the outer grooves;
    a plurality of rolling-element inner grooves distributed around the longitudinal axis, are defined on the outer surface of the inner shaft member, and each of which defines a radius of the inner groove;

a plurality of formed inner prismatic recesses that define a shape different than that of the outer and inner grooves and are empty and defined between respective lower parts of the inner grooves such that corresponding outer and inner recesses are radially spaced from each other and each of which defines a radius of the inner recess lesser than that of the inner and outer grooves;

a plurality of rolling elements that are rollingly arranged in the outer and inner grooves and rollingly engage the outer and inner shaft members during telescoping movement of the shaft assembly; and a sleeve-like cage that is arranged within the interior bore of the outer shaft member between the outer surface of the inner shaft member and inner surface of the outer shaft member, the sleeve-like cage defines a plurality of radial-through pockets in which corresponding ones of the rolling elements are engaged and kept spaced from each other in a set of imaginary planes defined in the outer and inner grooves and defined substantially perpendicular to the longitudinal axis.

15. The rolling-element telescoping shaft assembly of claim 14, wherein a depth of each of the plurality of formed inner prismatic recesses is different than a depth of each of the plurality of formed outer prismatic recesses.

* * * * *